Nov. 10, 1970   R. W. RAUTH ET AL   3,540,027
LIQUID LEVEL CONTROL AND INDICATING APPARATUS
Filed Feb. 17, 1966

INVENTORS
YEE LEE & ROBERT W. RAUTH
BY
Barnes, Kisselle, Raisch & Choate
ATTORNEYS United States Patent Office 3,540,027
Patented Nov. 10, 1970

3,540,027
LIQUID LEVEL CONTROL AND
INDICATING APPARATUS
Robert W. Rauth, Port Huron, and Yee Lee, Lexington,
Mich., assignors to The Bin-Dicator Company, Detroit,
Mich., a corporation of Michigan
Filed Feb. 17, 1966, Ser. No. 528,309
Int. Cl. G08b 21/00
U.S. Cl. 340—244                           3 Claims

ABSTRACT OF THE DISCLOSURE

A holding relay having its actuating coil connected in series with paralleled control branch circuits, one of which is controlled by a high level probe and the other of which is controlled by a low level probe. When the high level probe and the low level probe both contact the liquid, the combined current through both branch circuits energizes the relay, but after initial energization the current through the branch controlled by the low level probe is sufficient to maintain the relay energized. However, the current through the branch circuit controlled by the low level probe is insufficient to initially energize the relay.

---

This invention relates generally to control apparatus for material handling and more particularly to an apparatus for automatically controlling and indicating levels of electrically conductive materials, such as electrically conductive liquids in a container or the like.

The objects of this invention are to provide a material level control apparatus that effectively and reliably controls the level of material in a container; that is simple in construction and easy to operate; that is economical to construct and use relative to prior material level controls; that is useful in a wide variety of applications and in applications where the control is located remote from the material; that provides easily comprehended visual indications of the level of the material and of the operation of the control; that operates with liquids without electrolysis of the liquid; and that does not require adjustment or calibration during use.

Figure 1:
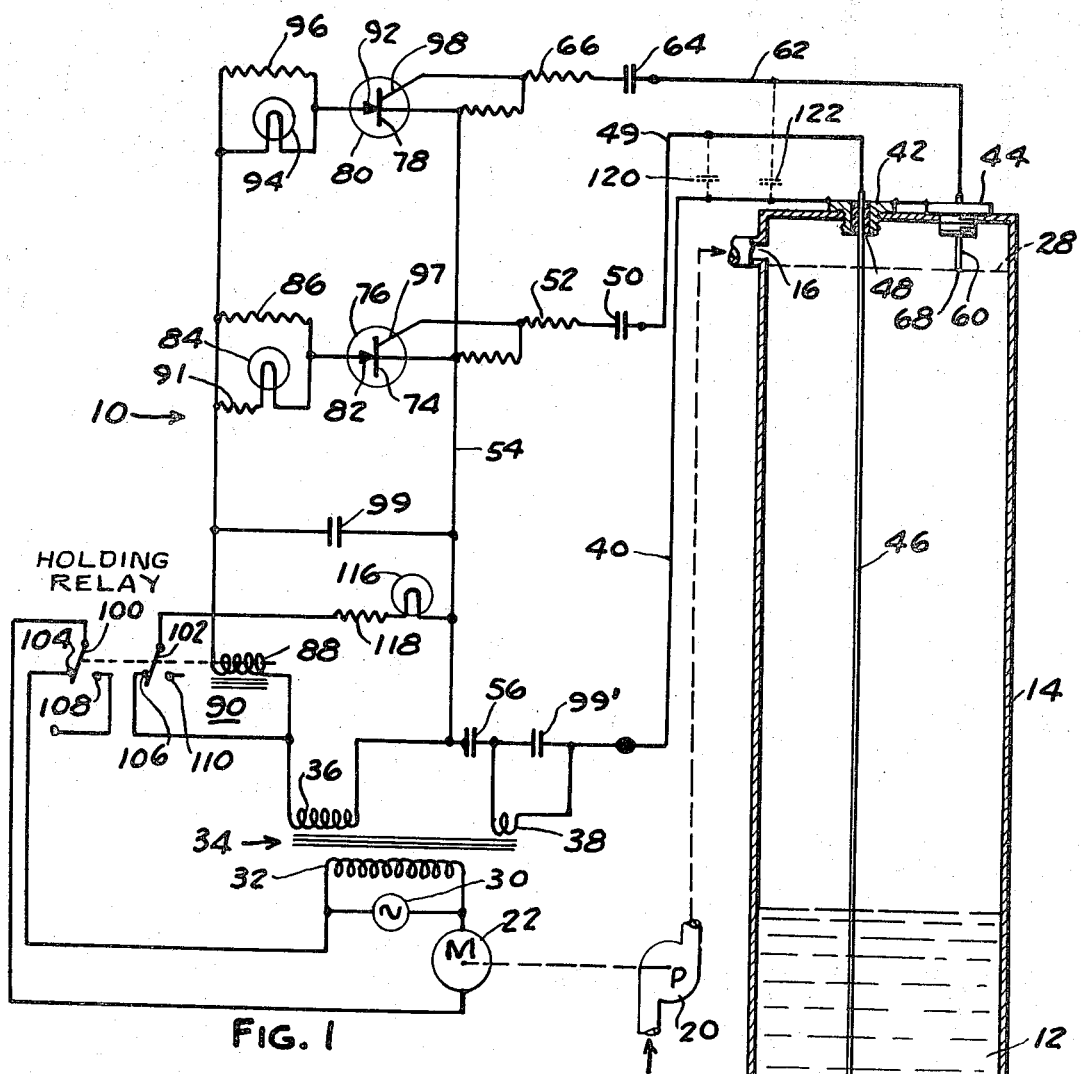
Figure 2:
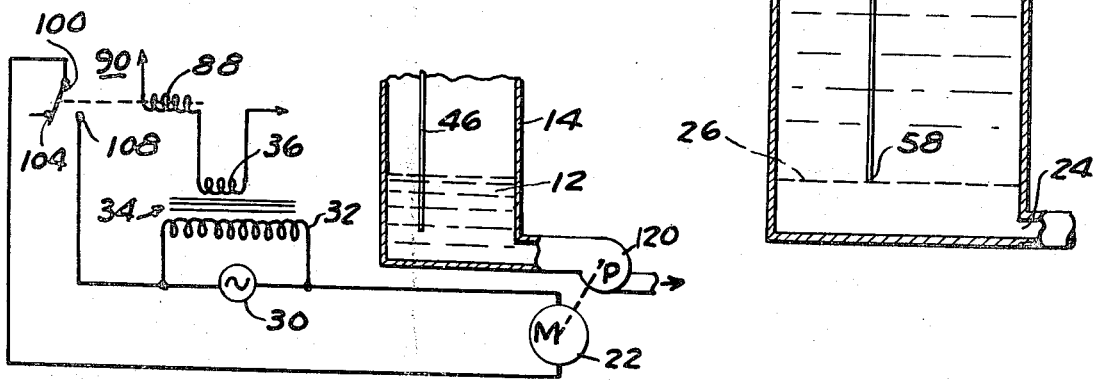

Other objects, features and advantages of the present invention will become apparent in connection with the following description, the appended claims and the accompanying drawings in which:

FIG. 1 illustrates a container for electrically conductive liquids and a control apparatus of the present invention applied to pump for supplying liquid to the container; and FIG. 2 illustrates a modification in the apparatus shown in FIG. 1 to remove liquid from the container.

For purposes of illustration, the control apparatus of the present invention is shown in FIG. 1 connected to control the level of electrically conductive liquid 12 in a closed metal container 14. The liquid 12 is supplied to the container through an inlet 16 by means of a pump 20 which is driven by a motor 22. Container 14 also has an outlet 24 and the control apparatus 10 operates pump 20 so that the level of liquid 12 does not fall below a low level 26 which is just above the outlet 24 or rise above a high level 28 which is just below the inlet 16. In general, when the level of the liquid 12 drops below the low level 26, pump 20 is operated to add liquid to container 14 until the container is filled to the high level 28 at which time the pump 20 is turned off until the liquid again falls below the low level 26.

The control apparatus 10 generally comprises an alternating current source 30 which is connected across the primary 32 of a transformer 34 which also has a high voltage secondary winding 36 and a low voltage secondary winding 38. One end of the winding 38 is electrically connected to container 14 and thus to liquid 12 by a ground conductor 40 and a pair of connectors 42, 44 which are mounted in the top of container 14. A low level electrode 46 is supported in and isolated electrically from the connector 42 by an insulator sleeve 48. The electrode 46 is in turn electrically connected through a conductor 49, a capacitor 50, a voltage divider 52, a conductor 54 and a blocking capacitor 56 to the other end of the transformer 38. The electrode 46 extends vertically downwardly into container 14 and the length of the electrode is chosen so that its lower end 58 is disposed at the desired low level 26 to complete the circuit through electrode 46 whenever liquid 12 is above the low level 26. Similarly, a high level electrode 60 is supported in and electrically isolated from the connector 44 and is electrically connected to the winding 38 through a conductor 62, a capacitor 64, a voltage divider 66, conductor 54 and capacitor 56. The height of electrode 60 is chosen so that its lower end 68 is disposed at the high level 28 to complete the circuit through electrode 60 and liquid 12 when the liquid rises in container 14 to the high level 28. Conductors 40, 49 and 62 are incorporated in a cable which may be of substantial length so that the control 10 can be located remotely from container 14.

The high voltage winding 36 is connected through conductor 54 to the cathode 74 of a silicon controlled rectifier 76 and also to the cathode 78 of a silicon controlled rectifier 80. The anode 82 of rectifier 76 is connected through a lamp 84 and shunt resistor 86 and through the coil 88 of a holding relay 90 to the other end of winding 36. A resistor 91 in series with lamp 84 reduces the voltage across lamp 84 to lengthen the life of lamp 84. As used in this application, the terms "holding relay" and "holding relay means" include, but are not limited to, a relay which requires a current to initially energize the relay that is substantially higher than the current required to maintain the relay energized after initial energization. Stated differently, the pull-in current of relay 90 is higher than the holding current and the difference between the pull-in current and the holding current is sufficient to achieve the control operation of the present invention as will be described.

Referring again to FIG. 1, the anode 92 of rectifier 80 is connected through a lamp 94 and a shunt resistor 96 to coil 88 and then through the coil 88 to winding 36. Thus, the rectifiers 76, 80 are connected in parallel with each other and in series with the coil 88 across the secondary winding 36. Rectifier 76 has its gate electrode 97 connected to the divider 52 and rectifier 80 has its gate electrode 98 connected to the divider 66. A capacitor 99 is connected across the parallel rectifiers 76, 80 to prevent chattering of the relay 90 and isolate the low voltage circuit including winding 38 and electrodes 46, 60 from transients in the high voltage circuit including rectifiers 78, 80 and relay 90. Capacitor 56 and a shunt capacitor 99' across winding 38 also isolate the low voltage circuit from transients in the high voltage circuit. The relay 90 has a pair of contact arms 100, 102, two normally closed contacts 104, 106 and two normally open contacts 108, 110. Motor 22 is connected across the source 30 through arm 100 and contact 104. A third lamp 116 is connected across the secondary 36 through a resistor 118, arm 102 and contact 106. In the preferred embodiment of the present invention, lamp 94 is red, lamp 84 is green and lamp 116 is amber so that the lamps are readily distinguishable.

In accordance with one important aspect of the present invention, as previously stated the relay 90 requires a current to initially energize the relay that is larger than the holding current required to maintain the relay 90 energized after initial energization. In general, the circuit parameters and in particular, the values of resistors 86, 96, are chosen such that when either but not both of the rectifiers 76, 80 are conducting, the current through coil 88 is insufficient to initially pull in relay 90. However, the combined current in coil 88 when rectifiers 76, 80 are both conducting simultaneously is sufficient to initially pull in the relay 90 and thus open contacts 104, 106 and close contacts 108, 110. After the relay is energized, current through rectifier 76 alone (with rectifier 80 off) is sufficient to maintain the relay 90 energized.

The operation of the control apparatus 10 can best be understood assuming that the liquid 12 in the container 14 is initially below the low level 26. Motor 22 will be connected across source 30 through contact 104 and the motor will drive pump 20 to transfer liquid 12 into the container 14. Lamp 116 is on to indicate that pump 22 is on and lamps 84, 94 are off to indicate that the liquid in container 14 is below level 26. When the liquid in container 14 reaches the low level 26 and contacts the lower end 58 of the electrode 46, a small current flows through liquid 12, electrode 46 and divider 52 to forward bias the gate electrode 97 of rectifier 76. However, with rectifier 76 conducting, the current through coil 88 is not sufficient to pull in relay 90 and motor 20 remains energized so that pump 20 continues to supply liquid into the container 14. Additionally, when rectifier 76 conducts, lamp 84 lights to indicate that the level of liquid 12 is above the low level 26. When the liquid 12 reaches the high level 28, a small current flows through the liquid, electrode 60 and divider 66 to forward bias the gate electrode 98 and turn rectifier 80 on. When rectifier 80 conducts, lamp 94 lights to indicate that the liquid has reached the high level 28 and the current through rectifier 80 combined with the current through rectifier 76 energizes relay 90. Stated somewhat differently, when rectifiers 76, 80 are both conducting, the resistance in series with coil 88 is relatively small and the current through coil 88 is high enough to energize relay 90. When relay 90 is energized by the combined current through rectifiers 76, 80, contact 104 is opened to interrupt the current to motor 22 and turn the pump 20 off and contact 106 is opened to turn lamp 116 off and provide an indication that the pump is off.

As liquid is removed from the container 14, the circuit through electrode 60 will be broken when the level of the liquid drops below the high level 28. When this happens, rectifier 80 and lamp 94 are turned off to provide an indication that the liquid is below the level 28. Rectifier 76 continues to conduct and the current through coil 88 is sufficient to maintain relay 90 energized. When the level of liquid 12 falls below the low level 26, the circuit through the liquid and electrode 60 is broken to turn rectifier 76 off which in turn interrupts the current to relay 90. When relay 90 is de-energized, contact 104 is closed to start the pump 20 to add more liquid to the container 14 and contact 106 is closed to turn lamp 116 on which in turn indicates that pump 20 is on. The cycle set forth above will be repeated automatically as long as liquid is being removed from the outlet 24.

In a preferred embodiment of the present invention, the voltage developed by the winding 38 is relatively low, for example, on the order of three volts, and this low voltage together with the use of alternating current eliminates any possibility of electrolysis of the liquid 12 when the liquid contacts either of the electrodes 46, 60. The low voltage also prevents sparking at the electrodes 46, 60. The electrodes 60, 46 are isolated from the higher voltage required for rectifiers 76, 80 and relay 90 by the separate high and low voltage windings 36, 38 and by capacitors 99, 56 and by means of rectifiers 76, 80, small currents through the electrodes effectively control large currents required for relay 90.

When the conductors 40, 49 and 62 are incorporated in a cable, interconductor capacitance will be present and thus small currents (leakage or charging currents) may ow in dividers 52, 66 due to this cable capacitance. Without some compensation, the leakage current might be sufficient to fire rectifiers 76 inadvertantly, particularly with long cables, for example, cables up to 500 feet long. The reactance of capacitors 50, 64 is made large relative to the cable capacitance for the longest cable that is to be used to limit the current in conductors 49, 62 and thus prevent misfiring or spurious operation of the rectifiers 76, 80 due to leakage in the current in the cable. Thus, it is also desirable to use cables that have low capacitance.

The control apparatus 10 described hereinabove is very reliable and is simple in construction since it requires only two switching elements (rectifiers 76, 80) and one relay (relay 90) to perform the complex control function described hereinabove. Numerous relays which require an energizing current that is larger than the holding current are commercially available. One such relay that has been used with the control apparatus of the present invention is manufactured by Guardian Electric Manufacturing Company and is sold under the commercial designation G 57719. This particular relay requires 320 milliamps pull-in current and 80 milliamps release current, that is, a holding current in excess of 80 milliamps. For twenty four volts across winding 36, resistor 86 was 150 ohms and resistor 96 was 62 ohms to achieve the required current differential. In general, an energizing-to-holding current ratio on the order of four-to-one is preferred to achieve reliable differential operation.

In FIG. 2, wherein elements corresponding to elements in FIG. 1 are designated by like reference numerals, there is illustrated a simple modification for operating a pump 120 to control the withdrawal of liquid from the container 14 where liquid is continuously supplied to the inlet 16. This operation is achieved by connecting pump 120 to the outlet 24 and by connecting the motor 22 to the source 30 through the normally open contact 108 of the relay 90. When the level of liquid 12 in the container 14 is at the high level 28, relay 90 will be pulled in by the combined current through rectifiers 76, 80 to close contact 108 and start pump 120. Liquid will be pumped out of container 14 until the level of the liquid drops below the low level 26. As long as the liquid is above the low level 26, the current through rectifier 76 maintains relay 90 energized. However, when the level of the liquid drops below the low level 26, rectifier 76 is turned off to interrupt current to the relay and open contact 108 to stop the pump 120. As the level of liquid rises above the low level 26, rectifier 76 will conduct but the current through rectifier 76 is insufficient to pull in the relay 90 and pump 120 remains off. However, as soon as the liquid reaches the high level 28, rectifier 80 conducts and the current through coil 88 when rectifiers 76, 80 are both conducting is sufficient to pull in the relay and start pump 120.

Although the control apparatus has been disclosed hereinabove for operating a pump (120, FIG. 2; 20, FIG. 1), other liquid control devices, such as valves, can be operated by relay 90. In the embodiments described above, the container 14 is electrically conducting and thus the electrical paths from electrodes 58, 60 to conductor 40 are through fluid 12 and the container. Where a non-conducting container is used, conductor 40 may be electrically connected to the fluid 12 by other means, such as a third electrode (not shown) mounted on the container and extending below level 26 so that the fluid always contacts the third electrode.

We claim:

1. In apparatus for controlling the level of electrically conductive material in a container, a first electrical contact disposable in said container so as to be in electrical contact with said material when said material reaches a first level in said container, first circuit means operative to provide a first current path through said material and said first contact when said first contact is in electrical contact with said material, a second electrical contact disposable in said container so as to be in electrical contact with said material when said material reaches a higher level in said container, second circuit means operative to provide a second current path through said material and said second contact when said second contact is in electrical contact with said material, third circuit means responsive to current flow in said first path and operative to provide a third current in a third current path whenever said first contact is in electrical contact with said material, fourth circuit means responsive to current flow in said second path and operative to provide a fourth current in a fourth current path whenever said second contact is in electrical contact with said material, said third circuit means including a first source of electrical energy and a controlled rectifier having a main anode-to-cathode conducting path and a gate electrode for controlling conduction in said anode-to-cathode path, said anode-to-cathode current path of said first controlled rectifier being operatively connected to said first source in said third current path to control said third current, said fourth circuit means including a second controlled rectifier having a main anode-to-cathode conducting path and a gate electrode for controlling conduction in said anode-to-cathode path of second rectifier, said anode-to-cathode current path of said second controlled rectifier being operatively connected to said first source in said fourth current path to control said fourth current, said first and said second circuit means including a second source of alternating current whose voltage is substantially less than the voltage of said first source, a first voltage divider connected in series with said first contact across said second source, said gate electrode of said first rectifier being electrically connected to said first voltage divider, a second voltage divider connected in series with said second contacts across said second source, said gate electrode of said second rectifier being electrically connected to said second voltage divider, and wherein said assembly further comprises holding relay means having contacts and coil means to open and close said relay contacts, said coil means has first and second terminals, said third path includes said first source, the anode-to-cathode path of said first rectifier and said first and said second terminals, and said fourth current path includes said first source, said anode-to-cathode path of said second rectifier and said first and said second terminals of said coil means so that said rectifiers are connected in parallel with each other and in series with said coil means across said first source, and wherein said holding relay means is constructed so that a first predetermined current value required to initially energize said relay means is greater than a second predetermined current value required to maintain said relay means energized after initial energization of said relay means, and wherein one of said third and said fourth currents is at least equal to said second predetermined current value and less than said first predetermined current value, said third and said fourth currents have a combined value at least equal to said first predetermined current value whereby one of said third and said fourth currents alone does not initially energize said relay means, said third and said fourth currents together energize said relay and said one current maintains said relay energized after initial energization of said relay by said third and said fourth currents.

2. The apparatus set forth in claim 1 further comprising an electrical cable having three conductors and predetermined maximum cable capacitance, a first capacitor connected in said first current path between said voltage divider and one end of one conductor in said cable, the other end of said one conductor being electrically connected to said first contact, a second capacitor connected in said second current path between the second voltage divider and one end of a second conductor, the other end of said second conductor being electrically connected to said second contact, said third conductor being electrically connected to said material and to said second source, and said first and said second capacitors have a reactance at the frequency of said second source that is substantially greater than the reactance of said cable capacitance at said frequency.

3. In apparatus for controlling the level of electrically conductive material in a container, a first electrical contact disposable in said container so as to be in electrical contact with said material when said material reaches a first level in said container, first circuit means operative to provide a first current path through said material and said first contact when said first contact is in electrical contact with said material, a second electrical contact disposable in said container so as to be in electrical contact with said material when said material reaches a higher level in said container, second circuit means operative to provide a second current path through said material and said second contact when said second contact is in electrical contact with said material, third circuit means responsive to current flow in said first path and operative to provide a third current in a third current path whenever said first contact is in electrical contact with said material, fourth circuit means responsive to current flow in said second path and operative to provide a fourth current in a fourth current path whenever said second contact is in electrical contact with said material, and holding relay means having contacts and coil means to open and close said contacts and being constructed so that a first predetermined current value required to initially energize said relay means is greater than a second predetermined current value required to maintain said relay means energized after initial energization of said relay means, one of said third and said fourth currents being at least equal to said second predetermined current value and less than said first predetermined current value, said third and said fourth currents having a combined value at least equal to said first predetermined current value, and wherein said coil means is operatively connected in said third current path and said fourth current path so that said one of said third and said fourth currents alone does not initially energize said relay means, said third and said fourth current together energize said relay and said one current maintains said relay energized after initial energization of said relay by said third and said fourth currents, and wherein said assembly further comprises a source of electrical energy included in said third circuit means, a first electron control device having a main conducting path and a signal input for controlling conduction therethrough, said main conduction path being operatively connected to said source in said third current path to control said third current, a second electron control device having a main conducting path and a signal input for controlling conduction therethrough, said main conduction path of said second electron control device being operatively connected to said source in said fourth current path to control said fourth current, said coil means being operatively connected to said first and said second electron control devices and said source to be initially energized in response to combined current flow in said third and fourth paths, a first indicator lamp connected in said third path in series with said main conducting path of said first device to indicate when current is flowing in said third path, a second indicator lamp connected in said fourth path in series with said main conducting path of said second device to indicate when current is flowing in said fourth path and a third indicator lamp responsive to initial energization of said relay to indicate when said relay is energized.

(References on following page)

References Cited

UNITED STATES PATENTS

| | | | |
|---|---|---|---|
| 2,700,153 | 1/1955 | Huckabee | 340—244 |
| 2,766,406 | 10/1956 | Schwarzkopf | 340—244 |
| 2,799,848 | 7/1957 | Glantz et al. | 340—222 |
| 3,170,479 | 2/1965 | Mueller | 340—244 |
| 3,252,420 | 5/1966 | Sorensen | 340—244 |
| 3,253,188 | 5/1966 | Nissel | 340—244 |
| 3,279,379 | 10/1966 | Klyce | 340—244 |
| 3,340,892 | 9/1967 | Holland | 340—244 |
| 3,341,836 | 9/1967 | Marcum | 340—244 |

FOREIGN PATENTS 539,827   9/1941   Great Britain.

OTHER REFERENCES

Design of Switching Circuits, Keister Ritche, Washburn (USA) copyright 1951, pp. 31–32.

THOMAS B. HABECKER, Primary Examiner

D. MYER, Assistant Examiner

U.S. Cl. X.R.

340—222; 417—36